United States Patent
Larsen et al.

(10) Patent No.: US 11,692,141 B2
(45) Date of Patent: Jul. 4, 2023

(54) METHODS AND SYSTEMS FOR ENHANCING PROCESSING OF HYDROCARBONS IN A FLUID CATALYTIC CRACKING UNIT USING A RENEWABLE ADDITIVE

(71) Applicant: MARATHON PETROLEUM COMPANY LP, Findlay, OH (US)

(72) Inventors: Nikolas A. Larsen, Findlay, OH (US); Jeffrey A. Sexton, Findlay, OH (US); Ray Brooks, Findlay, OH (US)

(73) Assignee: MARATHON PETROLEUM COMPANY LP, Findlay, OH (US)

(*) Notice: Subject to any disclaimer, the term of this patent is extended or adjusted under 35 U.S.C. 154(b) by 0 days.

(21) Appl. No.: 18/045,314

(22) Filed: Oct. 10, 2022

(65) Prior Publication Data
US 2023/0113140 A1    Apr. 13, 2023

Related U.S. Application Data

(60) Provisional application No. 63/262,342, filed on Oct. 10, 2021.

(51) Int. Cl.
*C10G 11/18* (2006.01)
*B01J 8/24* (2006.01)
(Continued)

(52) U.S. Cl.
CPC ........... *C10G 11/182* (2013.01); *B01J 8/1809* (2013.01); *B01J 8/1836* (2013.01); *B01J 8/24* (2013.01);
(Continued)

(58) Field of Classification Search
CPC ...... C10G 2300/1011; C10G 2300/202; C10G 2300/4006; C10G 2300/4081;
(Continued)

(56) References Cited

U.S. PATENT DOCUMENTS

| | | |
|---|---|---|
| 5,443,716 A | 8/1995 | Anderson et al. |
| 5,540,893 A | 7/1996 | English |

(Continued)

FOREIGN PATENT DOCUMENTS

| | | |
|---|---|---|
| CN | 215288592 | 12/2021 |
| EP | 3878926 | 9/2021 |

(Continued)

OTHER PUBLICATIONS

Andrea De Rezende Pinho et al., Fast pyrolysis oil from pinewood chips co-processing with vacuum gas oil in an FCC unit for second generation fuel production, Fuel 188 (2017) 462-473.
(Continued)

*Primary Examiner* — Brian A McCaig
(74) *Attorney, Agent, or Firm* — Womble Bond Dickinson (US) LLP

(57) ABSTRACT

Systems and methods for enhancing the processing of hydrocarbons in a FCC unit by introduction of the coked FCC catalyst from the FCC reactor and a renewable feedstock to the FCC regenerator to facilitate regeneration of the coked FCC catalyst. The renewable feedstock can contain biomass-derived pyrolysis oil. The biomass-derived pyrolysis oil and coke from the coked FCC catalyst are oxidized by oxygen to provide a regenerated catalyst that is recycled to the FCC reactor.

29 Claims, 5 Drawing Sheets

(51) Int. Cl.
  B01J 8/18 (2006.01)
  B01J 38/02 (2006.01)
(52) U.S. Cl.
  CPC ............. B01J 38/02 (2013.01); C10G 11/187 (2013.01); *B01J 2208/00017* (2013.01); *C10G 2300/1011* (2013.01); *C10G 2300/202* (2013.01); *C10G 2300/4006* (2013.01); *C10G 2300/4081* (2013.01); *C10G 2300/708* (2013.01)
(58) Field of Classification Search
  CPC . C10G 2300/708; B01J 8/1809; B01J 8/1836; B01J 8/24; B01J 38/02; B01J 2208/00017
  See application file for complete search history.

(56) References Cited

U.S. PATENT DOCUMENTS

| | | | |
|---|---|---|---|
| 7,682,501 | B2 | 3/2010 | Soni et al. |
| 7,932,424 | B2 | 4/2011 | Fujimoto et al. |
| 8,753,502 | B1 | 6/2014 | Sexton et al. |
| 8,829,258 | B2 | 9/2014 | Gong et al. |
| 9,109,177 | B2 | 8/2015 | Freel et al. |
| 9,428,695 | B2 | 8/2016 | Narayanaswamy et al. |
| 9,663,729 | B2 | 5/2017 | Baird et al. |
| 10,435,339 | B2 | 10/2019 | Larsen et al. |
| 10,479,943 | B1 | 11/2019 | Liu et al. |
| 10,563,130 | B2 | 2/2020 | Narayanaswamy et al. |
| 10,570,078 | B2 | 2/2020 | Larsen et al. |
| 10,640,719 | B2 | 5/2020 | Freel et al. |
| 11,214,741 | B2 | 1/2022 | Davydov et al. |
| 11,306,253 | B2 | 4/2022 | Timken et al. |
| 11,319,262 | B2 | 5/2022 | Wu et al. |
| 11,421,162 | B2 | 8/2022 | Pradeep et al. |
| 2013/0112313 | A1 | 5/2013 | Donnelly et al. |
| 2014/0121428 | A1 | 5/2014 | Wang et al. |
| 2014/0316176 | A1 | 10/2014 | Fjare et al. |
| 2015/0005547 | A1 | 1/2015 | Freel et al. |
| 2015/0005548 | A1 | 1/2015 | Freel et al. |
| 2015/0166426 | A1 | 6/2015 | Wegerer et al. |
| 2015/0240167 | A1 | 8/2015 | Kulprathipanja et al. |
| 2015/0337207 | A1 | 11/2015 | Chen et al. |
| 2016/0090539 | A1 | 3/2016 | Frey et al. |
| 2016/0168481 | A1 | 6/2016 | Ray et al. |
| 2016/0244677 | A1 | 8/2016 | Froehle |
| 2016/0312127 | A1* | 10/2016 | Frey .................... C10G 11/187 |
| 2018/0371325 | A1 | 12/2018 | Streiff et al. |
| 2020/0181502 | A1 | 6/2020 | Paasikallio et al. |
| 2021/0301210 | A1 | 9/2021 | Timken et al. |

FOREIGN PATENT DOCUMENTS

| | | |
|---|---|---|
| FR | 2357630 | 2/1978 |
| WO | 2012062924 | 5/2012 |
| WO | 2017207976 | 12/2017 |
| WO | 20220144495 | 7/2022 |
| WO | 2022220991 | 10/2022 |

OTHER PUBLICATIONS

Rodriguez, Elena et al., Coke deposition and product distribution in the co-cracking of waste polyolefin derived streams and vacuum gas oil under FCC unit conditions, Fuel Processing Technology 192 (2019) 130-139.

Passamonti, Francisco J. et al., Recycling of waste plastics into fuels. LDPE conversion in FCC, Applied Catalysis B: Environmental 125 (2012) 499- 506.

* cited by examiner

METHODS AND SYSTEMS FOR ENHANCING PROCESSING OF HYDROCARBONS IN A FLUID CATALYTIC CRACKING UNIT USING A RENEWABLE ADDITIVE

CROSS-REFERENCE TO RELATED APPLICATIONS

The present application claims priority to and the benefit of U.S. Provisional Application No. 63/262,342, filed Oct. 10, 2021, titled "METHODS AND SYSTEMS FOR ENHANCING PROCESSING OF HYDROCARBONS IN A FLUID CATALYTIC CRACKING UNIT USING A RENEWABLE ADDITIVE," the disclosure of which is incorporated herein by reference in its entirety.

TECHNICAL FIELD

This disclosure relates to systems and methods for enhancing the processing of hydrocarbons in a fluid catalytic cracking (FCC) unit by introduction of a renewable feedstock to the FCC regenerator. The disclosure relates to the addition of certain specific renewable feedstock as an additive to the FCC regenerator, such as biomass-derived pyrolysis oil.

BACKGROUND

FCC units are used in refining operations to produce gasoline and distillate fuels from higher molecular weight hydrocarbons. A catalytic FCC unit has two main components—a reactor and a regenerator. Severe hydroprocessing of FCC feedstock, such as required to meet gasoline sulfur specifications, can result in low FCC regenerator temperatures, low delta coke, and become an obstacle or constraint to unit optimization and refinery profitability. Several process variables can be changed to impact FCC regenerator temperature and formation of delta coke, but, historically the ability to incorporate biomass-derived feedstocks in response to this constraint has been limited. Traditional refinery streams/components that help with low regenerator temperature are almost always higher in sulfur or other contaminants that make processing of biomass-derived feedstocks in FCC unfavorable.

Co-processing of biomass-derived pyrolysis oil in the FCC riser of the FCC reactor cause several challenges. The bio-mass derived pyrolysis oil may cause stability/miscibility issues when the biomass-derived pyrolysis oil is mixed with the FCC feed and may include a potential to coke/plug when mixed at elevated temperatures. Certain studies have shown the development of 'tar balls' in the FCC stripper of the FCC reactor and more deposits in the FCC reactor were noted upon cleaning/inspection. The bio-mass derived pyrolysis oil may cause potential corrosion of stainless steel in the FCC riser of the FCC reactor. In addition to the corrosion concerns, co-processing of pyrolysis oil in a FCC riser results in significant amounts of oxygenates in the FCC hydrocarbon products. Increases in CO and CO2 can also exacerbate a FCC unit wet gas compressor constraint (commonly encountered in FCC units) and reduce unit/refinery profitability. Generation of water pulls hydrogen from going to liquid hydrocarbon products, thus leading to reduced FCC unit and refinery profitability. Oxygenates remaining in hydrocarbon products may also increase corrosion and/or operability concerns. In general, FCC yield/conversion value is proportional to the hydrogen content in FCC feed. The hydrogen content of some pyrolysis oil content is on par with FCC coke (6-8 weight percent (wt %)) and incremental FCC products/yields attributable to this feedstock are very poor.

SUMMARY

Provided here are systems and methods to address these shortcomings of the art and provide other additional or alternative advantages. The disclosure herein provides one or more embodiments of systems and methods for enhancing the processing of hydrocarbons in a FCC unit by introduction of a renewable feedstock to the FCC regenerator. In certain embodiments, the renewable feedstock provided as an additive to the FCC regenerator contains biomass-derived pyrolysis oil. Pyrolysis/bio-oil can be utilized as a FCC feedstock additive and is a low sulfur, low hydrogen content material that despite its traditional characteristics of low miscibility with hydrocarbons and high acidity, it may be used to debottleneck refinery FCC constraints and optimize refinery profitability. Design modifications are provided for new and/or existing FCC regenerators to enhance the throughput of hydrocarbons processed in a FCC unit therefrom, which may be used independently or in various combinations. Such systems and methods, when used in combination, may advantageously provide for consumption of renewable feedstocks in a FCC unit, decrease the energy consumption of a FCC regenerator, and increase FCC unit and refinery profitability.

In certain embodiments, the throughput of hydrocarbons processed in a FCC unit is enhanced by first introducing gas oil and steam into the riser of a FCC unit. The gas oil and steam are mixed with a catalyst that is fluidized in the riser. The gas oil is cracked into one or more FCC products in the presence of the catalyst and the steam, which causes one or more surfaces of the catalyst to be at least partially covered by coke. This coked FCC catalyst is separated from the FCC products in a cyclone of the FCC unit. This cyclone can be positioned in an upper portion of the FCC unit. The coked FCC catalyst from the cyclone of the FCC unit is passed to a regenerator, where oxygen and/or air and a biomass-derived pyrolysis oil are introduced into the regenerator to combust the biomass-derived pyrolysis oil and coke from the coked FCC catalyst. Through such combustion, the biomass-derived pyrolysis oil and coke are oxidized by the oxygen (and/or, in some embodiments, oxygen in supplied air), this leading to regeneration of the catalyst. This regenerated catalyst is returned from the regenerator to the riser of the FCC unit. In certain embodiments, the introduction of the biomass-derived pyrolysis oil allows for an increase of the temperature inside the regenerator by at least about 5 degrees Fahrenheit (° F.) without adversely affecting properties of the FCC products. For example, the sulfur specifications of the FCC products are maintained. The use of the biomass-derived pyrolysis oil can also increase the temperature inside the regenerator while maintaining sulfur specification of gasoline in the FCC products below a preselected value. This temperature increase can range from at least about 5° F. to about 25° F. More than 90% of the sulfur content, but generally less than 50% of the total gasoline supply, is contributed by heavier feeds, which are cracked in the FCC. Current maximum gasoline sulfur limits vary widely from 10 ppm to 2,500 ppm depending on the jurisdiction. The sulfur content of the various FCC products can vary from about 0.01 weight percent to about 4.5 weight percent. Certain products, such as ultra-low sulfur diesel, low sulfur vacuum gas oil, and low sulfur heavy fuel oils, have a sulfur content less than about 0.5 weight percent. Certain products, such as GVL slurry and heavy sulfur vacuum gas oil, have a sulfur content from about 1 weight percent to about 2 weight percent. Certain products, such as heavy sulfur heavy fuel oil and asphalt, have a sulfur content from about 3 weight percent to about 4.5 weight percent.

In certain embodiments, the method of processing a gas oil in a FCC unit may include introducing gas oil and steam into a riser of a FCC unit, mixing the gas oil and the steam with catalyst or FCC catalyst that is fluidized in the riser, and cracking the gas oil into one or more FCC hydrocarbon products in the FCC unit. The cracking of the gas oil causes one or more surfaces of the catalyst to be at least partially covered by coke, thus producing or defining a coked FCC catalyst. The method may further include separating the coked FCC catalyst from the one or more FCC hydrocarbon products in a cyclone of the FCC unit, passing the coked FCC catalyst from the cyclone of the FCC unit to a regenerator, introducing at least oxygen and a biomass-derived pyrolysis oil into the regenerator, and combusting the biomass-derived pyrolysis oil and the coke from the coked FCC catalyst in the regenerator. The biomass-derived pyrolysis oil and coke are oxidized by the oxygen and the oxidation and/or combustion provide a regenerated catalyst, which is then returned or supplied from the regenerator to the riser of the FCC unit. The regenerated catalyst may be further mixed with additional gas oil and/or additional steam in the riser of the FCC unit (e.g., the cracking operation beginning again with the regenerated catalyst). In certain embodiments, the biomass-derived pyrolysis oil has an effective hydrogen index of less than 1.5. In certain embodiments, the biomass-derived pyrolysis oil has an effective hydrogen index of less than 1. Introducing the biomass-derived pyrolysis oil into the regenerator can allow the temperature inside the regenerator to be increased without adversely affecting one or more properties of the one or more FCC products. This temperature increase can be at least about 5° F. This temperature increase can be at least about 10° F. This temperature increase can be at least about 15° F. This temperature increase can be at least about 20° F. In certain embodiments, introducing the biomass-derived pyrolysis oil increases the temperature inside the regenerator while maintaining sulfur specifications of the one or more FCC products. This temperature increase can range from at least about 5° F. to about 25° F. In an example, the sulfur level in the FCC product, based on the specification of gasoline (e.g., one of a FCC product), is maintained below a pre-selected value. The biomass-derived pyrolysis oil can be introduced proximate to a bottom portion of the regenerator or the biomass-derived pyrolysis oil can be introduced into a bed of coked FCC catalyst positioned inside the regenerator.

In another embodiment, the method may include determining, based on a signal received by a controller from a temperature sensor positioned within the regenerator, a temperature within the regenerator; and in response to a determination that the temperature within the regenerator is less than a preselected temperature, adjusting, via a flow control device associated with the biomass-derived pyrolysis oil in signal communication with the controller, an amount of the biomass-derived pyrolysis oil introduced into the regenerator to thereby adjust the temperature within the regenerator.

Another embodiment of the disclosure is directed to a method of processing a gas oil in a fluid catalytic cracking (FCC) unit to increase yield selectivities. The method may include introducing the gas oil and steam into a riser of a FCC unit. The method may include mixing the gas oil and the steam with a catalyst fluidized in the riser. The method may include cracking the gas oil into one or more hydrocarbon products in the FCC unit, thereby to cause one or more surfaces of the catalyst to be at least partially covered by coke so as to define a coked catalyst. The method may include separating the coked catalyst and pyoil from the one or more hydrocarbon products in a cyclone positioned in an upper portion of the FCC unit. The method may include introducing a biomass-derived pyrolysis oil into the FCC unit. The biomass-derived pyrolysis oil may comprise one or more of a low miscibility with the gas oil and steam, low hydrogen content, and low sulfur content. The method may include passing the coked catalyst and the biomass-derived pyrolysis oil from the cyclone of the FCC unit to a regenerator. The method may include introducing at least oxygen into the regenerator. The method may include combusting a combination of the biomass-derived pyrolysis oil and the coke from the coked catalyst in the regenerator, thereby to oxidize via the oxygen and produce a regenerated catalyst and a flue gas. The method may include returning the regenerated catalyst from the regenerator to the riser of the FCC unit.

In another embodiment, the low miscibility of pyoil may prevents the pyoil from mixing with the gas oil, steam, and catalyst. In another embodiment, introduction of the biomass-derived pyrolysis oil may comprise introduction of the biomass-derived pyrolysis oil into one or more of a stripping zone of the FCC unit or a stand-pipe configured to connect the FCC unit to the regenerator. The method may also include introducing additional biomass-derived pyrolysis oil into the regenerator. The amount of biomass-derived pyrolysis oil introduced into the FCC unit and the amount of additional biomass-derived pyrolysis oil introduced into the regenerator may be based on one or more of a temperature within the regenerator, a temperature within the riser, or a temperature of the regenerated catalyst. The amount of biomass-derived pyrolysis oil introduced into the riser is about 1% to about 2% wt % of the gas oil.

In another embodiment, the low sulfur content of the biomass-derived pyrolysis oil may cause the hydrocarbon product to remain within a sulfur specification. In another embodiment, the low hydrogen content of the biomass-derived pyrolysis oil may inhibit production of saturated products and increase production of olefinic material.

In another embodiment, the method may include determining, based on a signal received by a controller from a temperature sensor positioned within the regenerator, a temperature within the regenerator; and determining, based on a signal received by a controller from a temperature sensor positioned within the FCC unit, a temperature within the FCC unit. Further, the method may include, in response to one or more determinations that the temperature within the regenerator is less than a first preselected temperature or that the temperature within the FCC unit is less than a second preselected temperature, adjusting, via a flow control device associated with the biomass-derived pyrolysis oil in signal communication with the controller, an amount of the biomass-derived pyrolysis oil introduced into the riser based on the temperature within the regenerator and the temperature within the FCC unit to thereby adjust the temperature within the regenerator and FCC unit (e.g., the riser and/or reactor).

Certain embodiments include systems for processing a gas oil in a fluid catalytic cracking (FCC) unit. One such system may contain a riser having a first inlet to receive a gas oil stream, a second inlet to receive steam, and a third inlet to receive a FCC catalyst. The riser may be configured to be operated under cracking reaction pressure and temperature conditions to facilitate mixing and catalytic cracking of the gas oil stream in presence of the steam and the FCC catalyst to form a plurality of FCC products and coked FCC catalyst. The system further may include a reactor having (i) a FCC reaction zone connected to and in fluid communication with the upper portion of the riser and operated to continue the cracking of the gas oil stream in presence of the steam and the FCC catalyst to form more of the plurality of FCC products and more of the coked FCC catalyst, (ii) a separation zone to separate the plurality of FCC products from the coked FCC catalyst, (iii) a first outlet stream to transport the plurality of FCC products to a fractionation zone to separate the plurality of FCC products into one or more of propylene, isobutene, butylenes, gasoline, distillate, diesel fuel or heating oil, slurry oil and wet gas. The system may further include a regenerator connected to and in fluid communication with a second outlet stream of the reactor and having a fourth inlet stream to receive at least oxygen, a fifth inlet stream to receive biomass-derived pyrolysis oil, a third outlet stream being connected to and in fluid communication with the third inlet of the riser to supply a regenerated FCC catalyst to the riser, and a fourth outlet stream positioned to discharge a flue gas containing one or more of nitrogen, nitrogen oxides, carbon dioxide, carbon monoxide, or water vapor. In an embodiment, the oxygen may be supplied separate from and/or with ambient and/or atmospheric air. This regenerator is operated to oxidize coke on the coked FCC catalyst and the biomass-derived pyrolysis oil thereby to produce the regenerated FCC catalyst and the flue gas. The biomass-derived pyrolysis oil can be introduced proximate to a bottom portion of the regenerator or the biomass-derived pyrolysis oil can be introduced into a bed of the coked FCC catalyst positioned inside the regenerator.

In certain embodiments, the system further includes a stripping zone connected to and in fluid communication with the second outlet stream and the regenerator. The stripping zone is operated to remove adsorbed and entrained hydrocarbons from the coked FCC catalyst prior to supplying the coked FCC catalyst to the regenerator.

In certain embodiments, the oxidation of the biomass-derived pyrolysis oil in the regenerator increases temperature inside the regenerator by at least about 5° F. while maintaining a sulfur level in each of the plurality of FCC products, based on one or more specifications of the plurality of FCC products produced by processing the gas oil, below a pre-selected value. In certain embodiments, the introduction of the biomass-derived pyrolysis oil increases temperature inside the regenerator by at least about 5° F. while maintaining a sulfur level in each of the plurality of FCC products, based on a specification of gasoline in the plurality of FCC products, below a pre-selected value.

In certain embodiments, the biomass-derived pyrolysis oil has an effective hydrogen index of less than 1.5. In certain embodiments, the biomass-derived pyrolysis oil has an effective hydrogen index of less than 1. In certain embodiments, the quantity of biomass-derived pyrolysis oil that is introduced in the FCC regenerator is less than about 2 volume percent of the gas oil introduced into the riser of the FCC unit. In certain embodiments, the quantity of biomass-derived pyrolysis oil that is introduced in the FCC regenerator ranges from about 1 to about 2 volume percent of the gas oil introduced into the riser of the FCC unit.

Another embodiment of the disclosure is directed to a controller to control the processing a gas oil in a fluid catalytic cracking (FCC) unit. The controller may comprise a first set of one or more inputs in signal communication with one or more sensors positioned within one or more of a regenerator, a riser of an FCC unit, and/or a reactor of the FCC unit. The controller may receive signals from the one or more sensors indicative of a characteristic, the characteristic comprising one or more of temperature, pressure, and/or flow rate. The controller may comprise a first set of one or more inputs/outputs in signal communication with one or more flow control devices positioned on one or more inlets or outlets associated with the regenerator, the riser of the FCC unit, and/or the reactor of the FCC unit. The controller may, in response to the characteristic from one of the one or more sensors being less than or greater than a preselected threshold, adjust the one or more flow control devices via a signal indicating a new flow rate for the flow control device to adjust to.

These and other features, aspects, and advantages of the disclosure will be apparent from a reading of the following detailed description together with the accompanying drawings, which are briefly described below. The disclosure includes any combination of one or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

Figure 1:
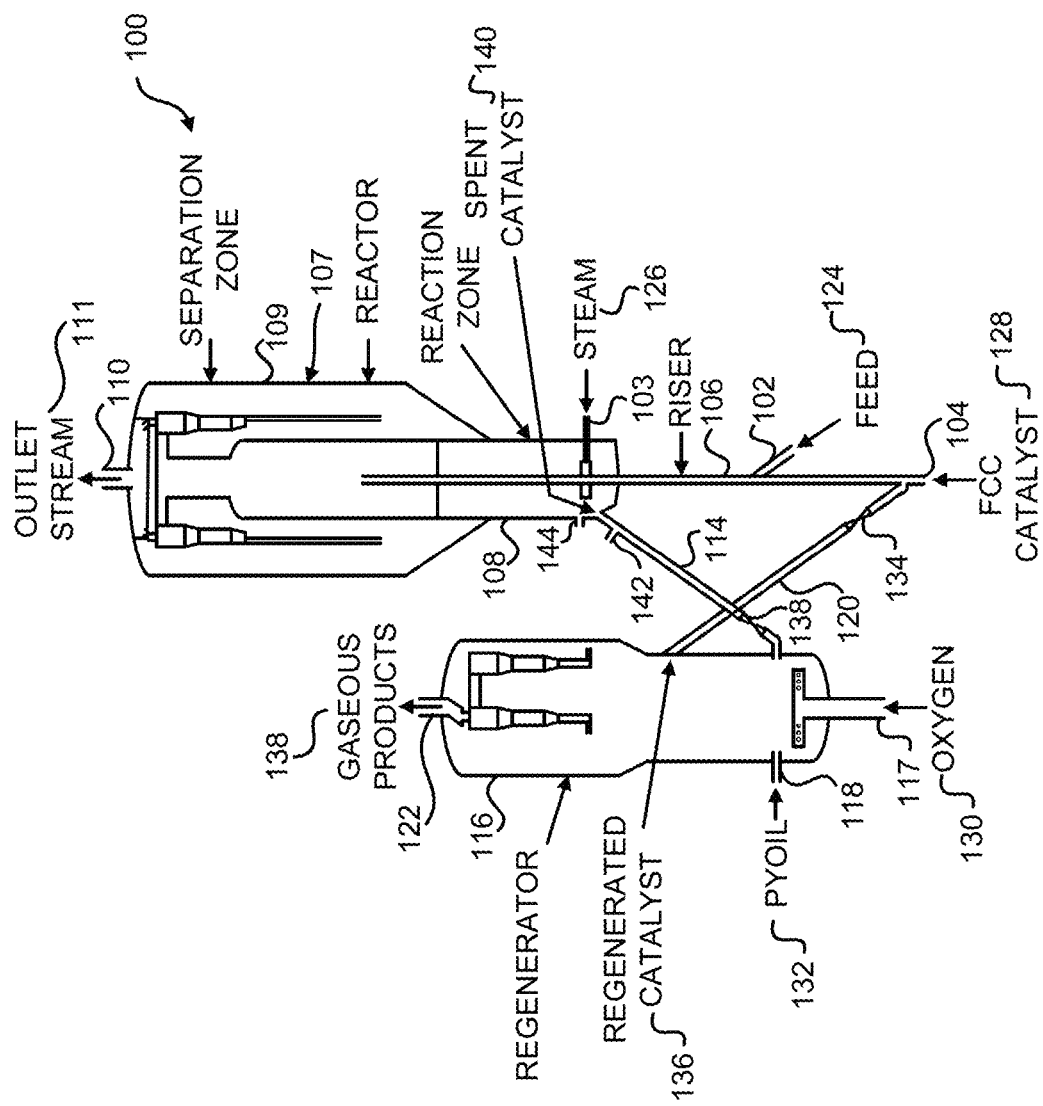

Having thus described the disclosure in general terms, reference will now be made to the accompanying drawings, which are not necessarily drawn to scale, and wherein:

FIG. 1 is a schematic diagram of a FCC unit according to an embodiment of the disclosure.

Figure 2:
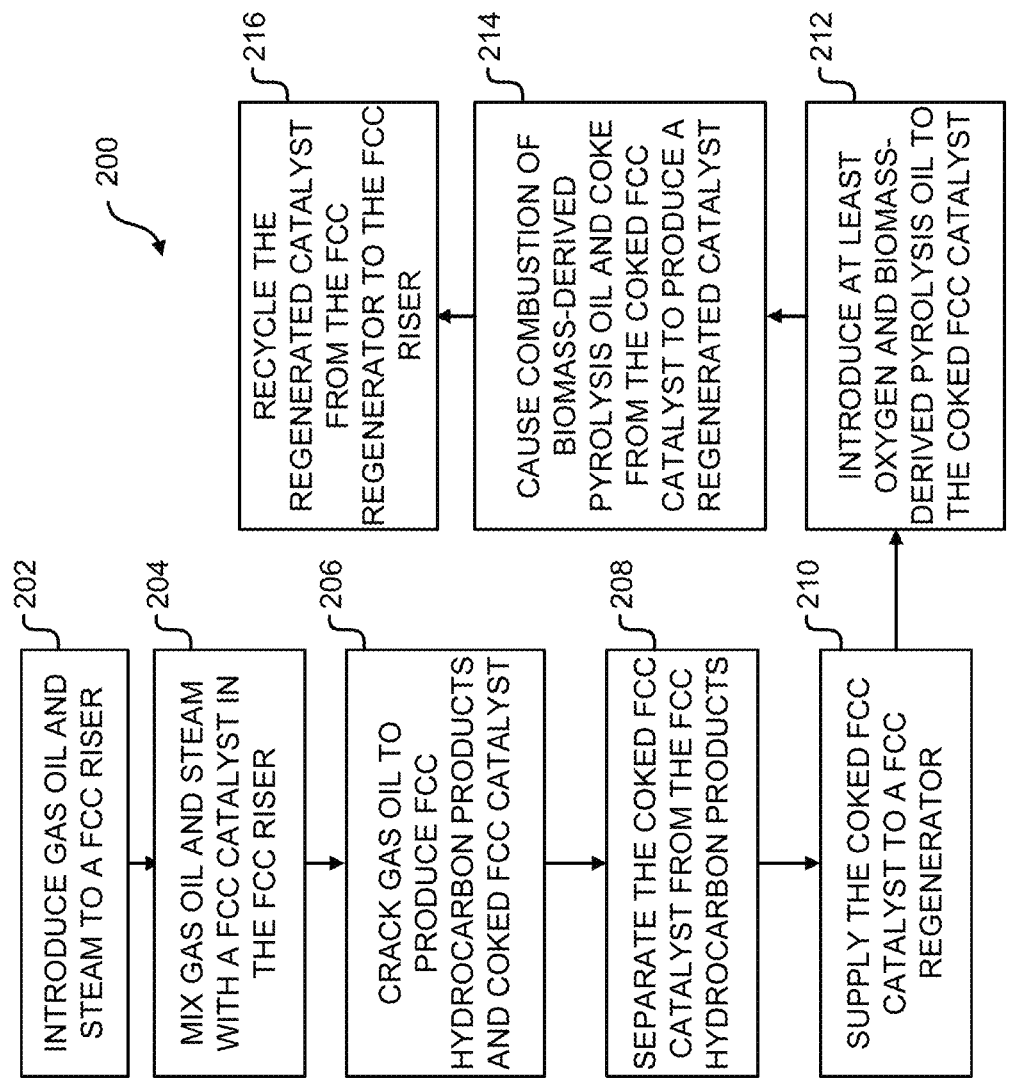

FIG. 2 is a block diagram of a method for processing of hydrocarbons in a FCC unit by introduction of a biomass-derived pyrolysis oil into the regenerator of the FCC reactor, according to an embodiment of the disclosure.

Figure 3:
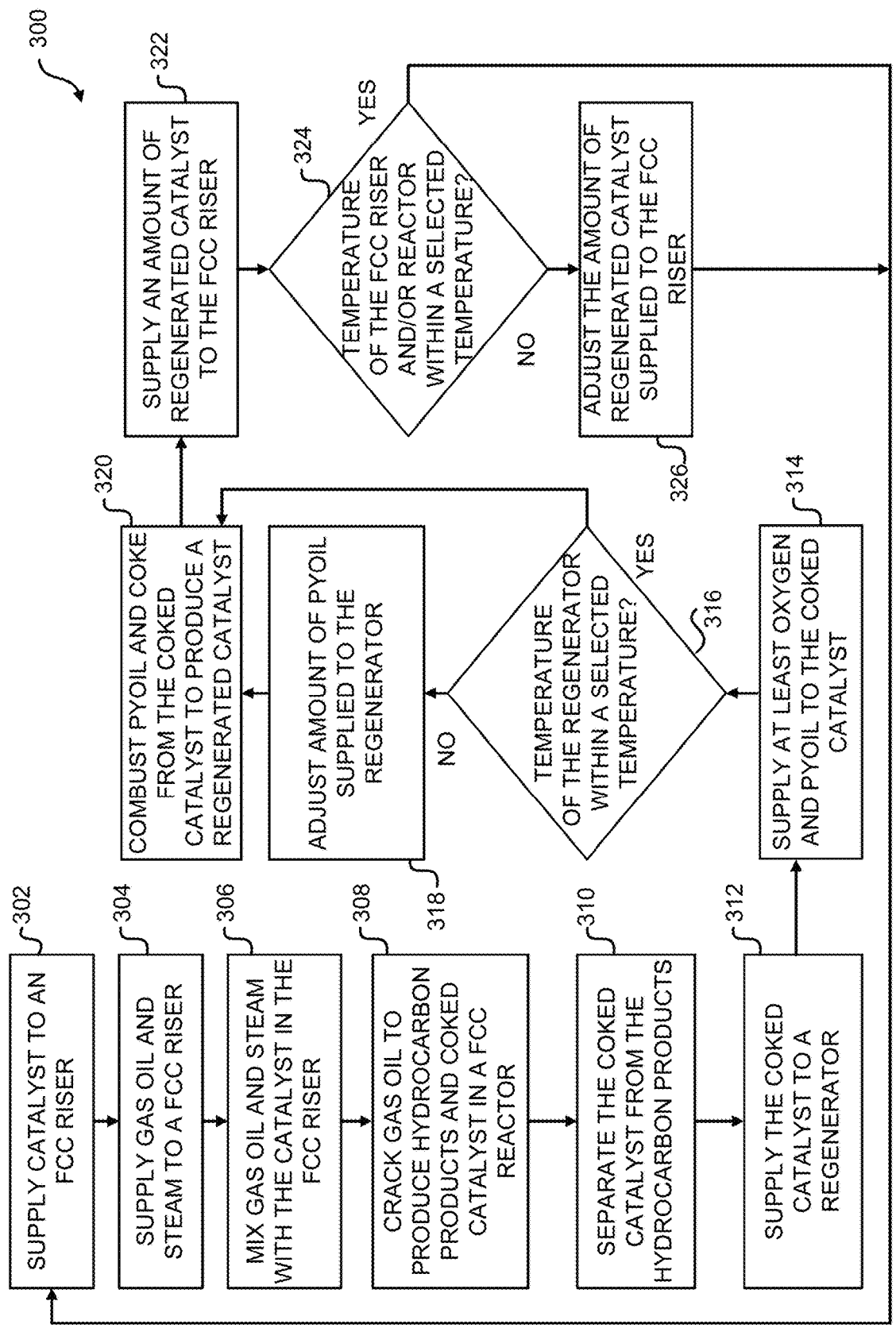

FIG. 3 is another block diagram of a method for processing of hydrocarbons in a FCC unit by introduction of a biomass-derived pyrolysis oil into the regenerator of the FCC reactor, according to an embodiment of the disclosure.

Figure 4:
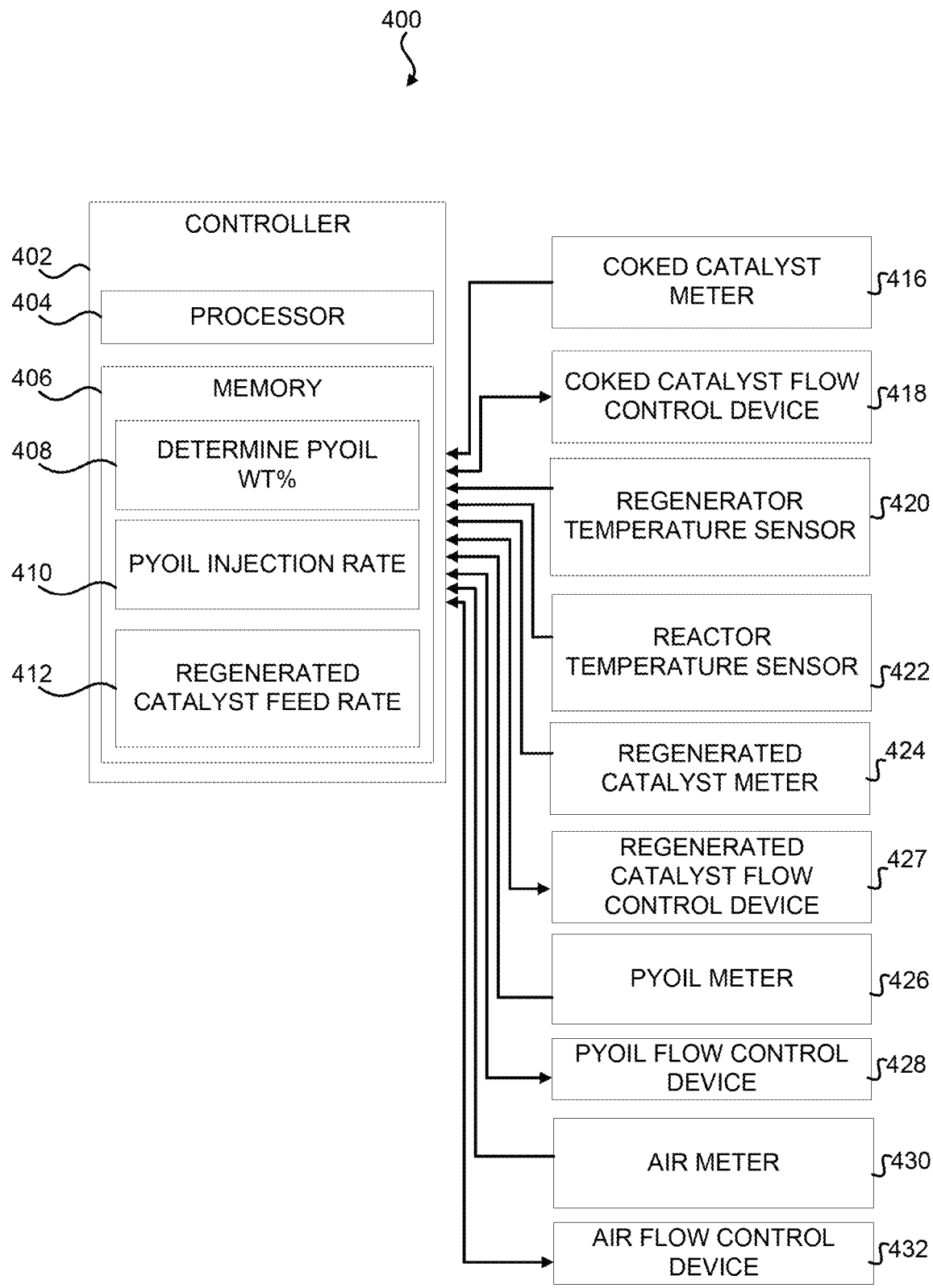

FIG. 4 is a simplified diagram illustrating a control system for managing the processing of hydrocarbons and regeneration of catalyst using biomass-derived pyrolysis oil, according to an embodiment of the disclosure.

Figure 5:
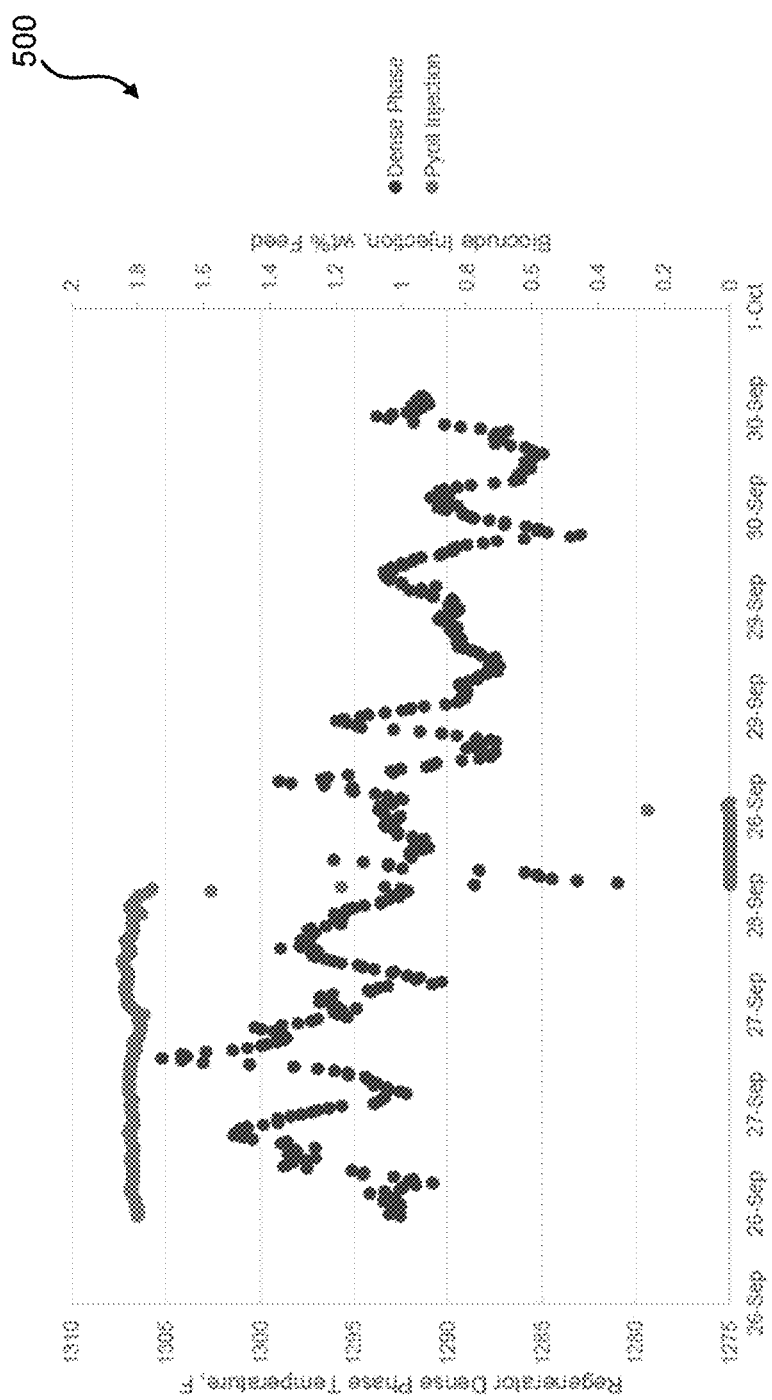

FIG. 5 is a graphical representation of the change in regenerator temperature with and without the introduction of the biomass-derived pyrolysis oil into the regenerator of the FCC reactor.

DETAILED DESCRIPTION

The disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

Biomass includes any renewable source, but does not include oil, natural gas, and/or petroleum. Biomass thus may include wood, paper, crops, animal and plant fats, triglycerides, biological waste, algae, or mixtures of these biological materials. Biomass-derived pyrolysis oil may be a complex mixture of several organic compounds, such as lignin fragments, aldehydes, carboxylic acids, carbohydrates, phenols, furfurals, alcohols, and ketones, derived from Rapid Thermal Processing (RTP) of biomass feedstocks. In some embodiments, the RTP of biomass produces the pyrolysis oil that can be utilized as a FCC feedstock additive to debottleneck refinery.

The FCC units may include "stacked" and "side-by-side" reactors, as well as other configurations. In a stacked reactor, the FCC reactor and the FCC regenerator may be contained in a single vessel with the FCC reactor above the FCC regenerator. The side-by-side reactor includes a separate FCC reactor and FCC regenerator, in other words, a side-by-side reactor may include two separate vessels, often positioned side by side.

In certain embodiments of the FCC unit, a gas oil stream, and steam may be supplied to a riser of a FCC unit. In the riser, the gas oil and steam are brought into contact with the catalyst for catalytic cracking and production of FCC products. The resulting mixture may continue upwardly through an upper portion of the riser. The FCC unit may further include a reactor in communication with the riser for continuing production of FCC products and then separating the FCC products from the coked FCC catalyst. During catalytic cracking, heavy material, known as coke, may be deposited onto the catalyst. The depositing of coke onto the catalyst may reduce catalytic activity of the catalyst. As such, regeneration is desired so the catalyst may be reused. In certain embodiments, the FCC reactor may be equipped with one or more cyclones. Most, substantially all, or a portion of the coked FCC catalyst may be transported to one or more cyclones in the reactor, where the coked FCC catalyst may be separated from the FCC hydrocarbon products. The FCC products may be transported into a fractionation or distillation zone downstream of the FCC reactor. In certain embodiments, the coked FCC catalyst with the adsorbed or entrained hydrocarbons may be passed or transported through a stripping zone. Stripping gas, such as steam, may enter a lower portion of the stripping zone and may rise counter-current to a downward flow of catalyst through the stripping zone, thereby removing adsorbed and entrained hydrocarbons from the coked FCC catalyst which flow upwardly through and are ultimately recovered with the steam by the cyclones. The FCC unit may further include a regenerator in communication with the FCC reactor, either directly or through the stripping zone, and configured to receive a portion of the coked FCC catalyst. After separation of the FCC products from the coked FCC catalyst, regeneration may be accomplished by burning off the coke from the coked FCC catalyst which restores the catalyst activity of the FCC catalyst. The regenerator may be equipped with inlets to supply oxygen and a biomass-derived pyrolysis oil to the coked FCC catalyst. The regenerator may be fed with oxygen and the biomass-derived pyrolysis oil in any ratio to the coked FCC catalyst by changing the flow rate of each into the regenerator. The biomass-derived pyrolysis oil and the coke in the coked FCC catalyst are oxidized by oxygen to produce the regenerated catalyst. In an embodiment, the biomass-derived pyrolysis oil may be injected into the reactor. Further, biomass-derived pyrolysis oil may be injected into a stand-pipe configured to connect the reactor to the regenerator and/or into a stripping zone of the reactor.

In an embodiment, the oxygen may be provided or supplied separate from and/or with ambient and/or atmospheric air. Ambient and/or atmospheric air may include varying amounts of nitrogen, oxygen, and/or other gases (e.g., argon, carbon dioxide, water vapor, and/or other small or trace amounts of other gases), as will be understood by one skilled in the art. Further, the ambient and/or atmospheric air may include about 78% nitrogen, about 21% oxygen, and about 1% of other gases (e.g., about 0.9% argon, about 0.05% carbon dioxide, and other small or trace amounts of gases including, but not limited to, water vapor, neon, helium, methane, and/or krypton, as will be understood by one skilled in the art). As noted, oxygen may be supplied to the regenerator (e.g., about 100% oxygen). In an embodiment, additional oxygen may be mixed with air (e.g., ambient and/or atmospheric air) in varying amounts and supplied to the regenerator. For example, the mixture of oxygen and air may include or comprise about 70% nitrogen, about 29% oxygen, and/or other gases; about 60% nitrogen, about 39% oxygen, and/or other gases; about 50% nitrogen, about 49% oxygen, and/or other gases; about 40% nitrogen, about 59% oxygen, and/or other gases; about 30% nitrogen, about 69% oxygen, and/or other gases; 20% nitrogen, about 79%, and/or other gases; about 20% nitrogen, about 79%, and/or other gases; about 10% nitrogen, about 89% oxygen, and/or other gases; about 99% oxygen and/or other gases (e.g., a mixture comprised of about 1% total of nitrogen, argon, carbon dioxide, water vapor, and/or other gases, as will be understood by one skilled in the art); and/or other varying percentages of nitrogen, oxygen, and/or other gases. In another embodiment, the additional oxygen may be supplied to the regenerator separate from the air (e.g., via another injection point or location). In an embodiment, the amount of air and/or oxygen injected or supplied to the regenerator may be controlled by a controller and/or flow control devices. The amount of air and/or oxygen (in addition to or rather than adjustment of biomass-derived pyrolysis oil injected into or supplied to the regenerator and/or reactor) may be varied based on the temperature within the regenerator (e.g., the temperature which may indicate the amount of coke on the coked catalyst that is combusted).

The regenerator may be operated at temperatures in the range of about 1000° F. to 1600° F., of about 1000° F. to about 1500° F., of about 1100° F. to about 1450° F., at about 1250° F. to about 1400° F., or about 1300° F. to achieve adequate combustion while keeping catalyst temperature below those temperatures at which significant catalyst degradation can occur and/or above a temperature such that cracking in the reactor may be efficient. In one or more other embodiments, the temperature in the regenerator may not exceed greater than or may be held at about 1450° F., about 1400° F., about 1350° F., about 1300° F., about 1250° F., about 1200° F., about 1150° F., about 1100° F., about 1050° F., and/or about 1000° F. The temperature at which significant catalyst degradation may occur may be based on a number of variables, such as the temperature and/or water content within the FCC unit (such characteristics may be monitored via one or more sensors and/or probes), among other factors. This processing of the biomass-derived pyrolysis oil in the regenerator alleviates FCC processing constraints and optimizes refinery profitability. The biomass-derived pyrolysis oil, when utilized as a FCC feedstock additive, may be injected in low concentrations into the regenerator of the FCC unit. While crackability of this FCC feedstock additive may be poor (high levels of coke precursors/aromatics), which results in lower FCC conversion, the impact on heat balance is significant.

The tendency of a biomass-derived pyrolysis oil to cause coking of a catalyst is measured by the effective hydrogen index (EHI), also called 'hydrogen to carbon effective ratio' in the literature (Chen et al., 1988).

$$EHI=(H-2O-3N-2S)/C$$

where H, O, N, S and C are the atoms per unit weight of the sample of hydrogen, oxygen, nitrogen, sulfur, and carbon, respectively.

In certain embodiments, the biomass-derived pyrolysis oil may have an effective hydrogen index of less than 1.5. In other embodiments, the biomass-derived pyrolysis oil may have an effective hydrogen index of less than 1. This FCC feedstock additive's low hydrogen content may also change or affect overall FCC yield selectivities. The FCC feedstock additive may be a net hydrogen receptor inside the FCC unit (lower hydrogen content than fresh feed). Depending on the incremental yields attributed to this FCC feedstock additive, additional economic value (e.g., renewable identification numbers, low carbon fuel standard credits, etc.) may be applicable. Utilizing this renewable FCC feedstock additive can sustainably debottleneck FCC operation/constraints and optimize refinery profitability.

Introduction of the biomass-derived pyrolysis oil directly into the regenerator in a FCC unit can benefit from additional delta coke. The yields related to biomass-derived pyrolysis oil introduced into the FCC reactor are relatively poor, such that processing or cracking this biomass-derived pyrolysis oil can result in negative yields of transportation fuels. As previously discussed, there are several challenges related to processing this biomass-derived pyrolysis oil on the reactor side of the FCC unit. Therefore, this selection of introduction of the biomass-derived pyrolysis oil to the regenerator or the FCC unit (e.g., the stripping zone of the reactor and/or a stand-pipe connecting the reactor to the regenerator) overcomes these challenges, and yields improvements, such as debottlenecking production constraints, further optimization of energy consumption, and reduced coke yield on fresh feed.

FIG. 1 a schematic diagram of a non-limiting, FCC system 100 according to one or more embodiments of the disclosure. A gas oil or feed stream 124 and steam 126 may be supplied to a riser 106 of a FCC system 100 via an inlet, conduit, pipe, or pipeline (e.g., conduit 102 and conduit 103, respectively). Appropriate FCC catalysts 128 may be supplied via a catalyst stream via an inlet, conduit, pipe, or pipeline (e.g., conduit 104), as will be understood by one skilled in the art. In the riser 106, the gas oil or feed stream 124 and steam 126 may be brought into contact with the FCC catalyst 128 or catalyst stream for catalytic cracking and production of FCC products. The injection location for the gas oil or feed stream 124 and steam 126 may be located anywhere in the riser/reactor and may be altered dependent upon the characteristics of the gas oil and the temperature of the FCC catalyst 128. In certain embodiments, the gas oil or feed stream 124 can contain one or more of other feeds, such as biomass, pyrolysis oil, conventional FCC feed streams, and decant oil. The riser 106 may be operated under cracking reaction pressure and temperature conditions (e.g., the pressure and/or temperature based on various factors, such as the type of gas oil, among other factors, as will be understood by one skilled in the art) to facilitate mixing and catalytic cracking of the gas oil stream in presence of the steam and the FCC catalyst to form a plurality of FCC products and coked FCC catalyst. The reaction temperature, feed stream rates, feed residence time, gas oil/steam FCC feed concentrations, and FCC catalyst loadings may be modified to obtain maximum fuel range products. The resulting mixture continues upwardly to the FCC reactor 107 through an upper portion of the riser 106. The FCC reactor 107 may contain a FCC reaction zone 108 connected to and in fluid communication with the upper portion of the riser 106 and operated to continue the cracking of the gas oil stream in presence of the steam and the FCC catalyst to form more of the plurality of FCC products and more of the coked FCC catalyst. The FCC reactor 107 may contain a separation zone 109 to separate the plurality of FCC products from the coked FCC catalyst. In certain embodiments, the separation zone 109 may contain one or more cyclones to separate the coked FCC catalyst from the plurality of FCC products. The FCC reactor 107 may also contain an outlet 110 to transport the plurality of FCC products from the separation zone 109 to a fractionation zone to separate the plurality of FCC products into one or more of propylene, isobutene, butylenes, gasoline, distillate, diesel fuel or heating oil, slurry oil and wet gas.

In certain embodiments, the coked FCC catalyst 128 with the adsorbed or entrained hydrocarbons may be passed into a stripping zone. Stripping gas, such as steam, may enter or may be injected into a lower portion of the stripping zone. The stripping gas may rise counter-current to a downward flow of catalyst through the stripping zone, thereby removing adsorbed and entrained hydrocarbons from the coked FCC catalyst which flows upwardly through and are ultimately recovered with the steam by the cyclones. In an embodiment, biomass-derived pyrolysis oil may be injected into the stripping zone at inlet or conduit 144. Such an inlet or conduit 144 may be dedicated to injection of the biomass-derived pyrolysis oil. The FCC system 100 may further include a regenerator 116 in fluid communication with the FCC reactor 107 (e.g., via a conduit, pipe, inlet/outlet, stand-pipe, or pipeline, such as conduit 114), either directly or through the stripping zone, and configured to receive a portion of the coked FCC catalyst via a spent catalyst stream 140 (e.g., via conduit 114). A valve 138 (e.g., such as a slide valve or control valve) may be positioned on the conduit 114 to control the amount of the coked FCC catalyst flowing to the regenerator 116. In an embodiment, an inlet 142 may be positioned on the conduit 114 to allow for injection of biomass-derived pyrolysis oil. After separation of the FCC products from the coked FCC catalyst, regeneration may be accomplished by burning off the coke from the coked FCC catalyst, which restores the catalyst activity of the FCC catalyst. The regenerator 116 may be equipped with an inlet 117 to supply at least oxygen 130 (e.g., the oxygen being supplied as oxygen and/or with ambient and/or atmospheric air) and a pyoil inlet 118 to supply biomass-derived pyrolysis oil (e.g., pyoil 132) to the coked FCC catalyst. The regenerator 116 may be fed with oxygen 130 (and/or, in some embodiments, air) and the biomass-derived pyrolysis oil in any ratio to the coked FCC catalyst by changing the flow rate of oxygen (and/or, in some embodiments, air) supplied via the inlet 117 and the biomass-derived pyrolysis oil 132 supplied via the pyoil inlet 118 into the regenerator 116. The biomass-derived pyrolysis oil 132 and the coke in the coked FCC catalyst may be oxidized by the oxygen (and/or, in some embodiments, the oxygen in the air) to produce the regenerated catalyst. Such a reaction may be exothermic as a large amount of heat is released from the oxidation. The gaseous products of coke oxidation, which may be referred to as flue gas, may exit the regenerator 116 via the exit stream 122. The balance of the heat may cause the regenerator to produce the regenerated catalyst. The regenerated catalyst, in addition to providing a catalytic function, may act as a vehicle for the transfer of heat from the regenerator 116 to the FCC riser 106. The regenerated catalyst may be transported from the regenerator 116 via a catalyst outlet stream to the FCC riser 106 (e.g., via a conduit 120). A valve 134 may be positioned on the conduit 120 to control the amount of the regenerated catalyst flowing to the riser 106. In an embodiment, the regenerated catalyst from the catalyst outlet stream 120 may be supplied to the riser 106 of a FCC system 100 via the catalyst stream 104.

In certain embodiments, the regenerator 116 of an existing FCC unit may be adapted or retro-fitted to add an element to allow for the introduction of the renewable feedstock or biomass-derived pyrolysis oil to the regenerator. For example, this element can be an installed independent and/or dedicated conduit, pipe, or pipeline for introducing the biomass-derived pyrolysis oil (e.g., for example, conduit 118). In another embodiment, conduit 118 may be a torch oil inlet. Prior to or upon initiation of a cracking operation, the torch oil inlet may be configured to allow gas oil, feed, and/or biomass-derived pyrolysis oil to flow therethrough to the regenerator to heat the regenerator. In another embodiment, conduit 118 may include a nozzle configured for injection of biomass-derived pyrolysis oil with or without steam.

The flow through this element (e.g., conduit 118) can be initiated, modified, or stopped by an independent control system or by a control system (e.g., such as a controller) for the regenerator or the FCC unit. Various control designs and/or schemes may also be suitable for use in introduction of the renewable feedstock to the regenerator of an existing FCC unit. Various configurations and arrangements of FCC reactor and the regenerator, including the positioning of various sections and/or components therein, may vary as will be understood by a person skilled in the art.

In another embodiment, the FCC system 100 may include a controller or control system (e.g., such as controller 402 in FIG. 4) and various sensors, probes, and/or control valves (e.g., valve 134 and/or valve 138) positioned throughout the FCC system 100 and in signal communication with the controller or control system. The controller or control system may receive and send information, data, and/or instructions to and from, respectively, the various sensors, probes, and/or control valves. In such examples, the controller or control system may receive some characteristic regarding one or more different parts of the FCC system 100 from the sensors or probes (e.g., temperature within the regenerator 116, riser 106, and/or reactor 107) and, based on those characteristics and one or more preselected thresholds (e.g., a preselected temperature range within the regenerator 116, riser 106, and/or reactor 107), adjust flow and/or amount of one or more materials or fluids flowing into or supplied to the regenerator 116 and/or riser 106 (e.g., gas oil, pyoil, fresh catalyst, regenerated catalyst, oxygen, air, and/or steam).

FIG. 2 is a block diagram of a method 200 for enhancing the processing of hydrocarbons in a FCC unit by introduction of a biomass-derived pyrolysis oil into the regenerator of the FCC unit. In an embodiment, the actions of method 200 may be completed within a control system (e.g., such as controller 402). Specifically, method 200 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 202, an amount of gas oil and steam may be introduced to into a riser of a FCC unit. The gas oil can be one or more of the following feeds: atmospheric and vacuum gas oil, light and heavy coker gas oil, hydrocracked residue, atmospheric residue, or deasphalted oil. The hydrocarbons in the gas oil feed includes paraffins and cycloparaffins, aromatic hydrocarbons with a different number of aromatic rings, and resins and asphaltenes. At block 204, the gas oil and the steam are mixed with a FCC catalyst that is fluidized in the riser, and at block 206, the gas oil is subject to catalytic cracking of the higher molecular weight hydrocarbons into one or more FCC products. The cracking of the gas oil causes one or more surfaces of the catalyst to be at least partially covered by coke, thus producing a coked FCC catalyst. At block 208 the coked FCC catalyst is separated from the one or more FCC products in a cyclone of the FCC unit and at block 210 of passing the coked FCC catalyst from the cyclone of the FCC unit to a regenerator. Further, at block 212, oxygen (and/or, in some embodiments, air) and a biomass-derived pyrolysis oil are introduced into the regenerator and mixed with the coked FCC catalyst, and at block 214, the biomass-derived pyrolysis oil and coke from the coked FCC catalyst undergo combustion in the regenerator. The biomass-derived pyrolysis oil and coke are oxidized by the oxygen (and/or, in some embodiments, the oxygen in the air) to provide a regenerated catalyst, which is then returned at block 216 from the regenerator to the riser of the FCC unit. In certain embodiments, the biomass-derived pyrolysis oil has an effective hydrogen index of less than 1.5. In certain embodiments, the biomass-derived pyrolysis oil has an effective hydrogen index of less than 1. Introducing the biomass-derived pyrolysis oil into the regenerator can allow the temperature inside the regenerator to be increased without adversely affecting one or more properties of the one or more FCC products. This temperature increase can range from at least about 5° F. to about 25° F. In certain embodiments, introducing the biomass-derived pyrolysis oil increases the temperature inside the regenerator while maintaining sulfur specifications of the one or more FCC products. For example, the sulfur level in a specification of gasoline, a FCC product, is maintained below a pre-selected value. More than 90% of the sulfur content, but generally less than 50% of the total gasoline supply, is contributed by heavier feeds, which are cracked in the FCC. Current maximum gasoline sulfur limits vary widely from 10 ppm to 2,500 ppm depending on the jurisdiction. The sulfur content of the various FCC products can vary from about 0.01 weight percent to about 4.5 weight percent. Certain products, such as ultra-low sulfur diesel, low sulfur vacuum gas oil, and low sulfur heavy fuel oils, have a sulfur content less than about 0.5 weight percent. Certain products, such as GVL slurry and heavy sulfur vacuum gas oil, have a sulfur content from about 1 weight percent to about 2 weight percent. Certain products, such as heavy sulfur heavy fuel oil and asphalt, have a sulfur content from about 3 weight percent to about 4.5 weight percent. The biomass-derived pyrolysis oil can be introduced proximate to a bottom portion of the regenerator or the biomass-derived pyrolysis oil can be introduced into a bed of coked FCC catalyst positioned inside the regenerator.

In certain embodiments, the quantity of biomass-derived pyrolysis oil that is introduced in the FCC regenerator is less than about 2 volume percent of the gas oil introduced into the riser of the FCC unit. In certain embodiments, the quantity of biomass-derived pyrolysis oil that is introduced in the FCC regenerator ranges from about 1 to 2 volume percent of the gas oil introduced into the riser of the FCC unit.

FIG. 3 is a block diagram of a method 300 for enhancing the processing of hydrocarbons in a FCC unit by introduction of a biomass-derived pyrolysis oil into the regenerator of the FCC unit. In an embodiment, the actions of method 300 may be completed within a control system (e.g., such as controller 402). Specifically, method 300 may be included in one or more programs, protocols, or instructions loaded into a memory of the control system and executed on a processor or one or more processors of the control system. The order in which the operations are described is not intended to be construed as a limitation, and any number of the described blocks may be combined in any order and/or in parallel to implement the methods.

At block 302, during a cracking operation or upon an initiation of a cracking operation, an amount of catalyst may be supplied to a riser or FCC riser of a FCC unit. The catalyst (also referred to as a FCC catalyst) may be comprised of a zeolite and/or other components (e.g., a matrix, binder, filler, etc.), as will be understood by one skilled in the art. As catalyst within the FCC unit is utilized in a cracking operation, the catalyst may attract coke or become coked (e.g., coke accumulates on the catalyst). The coked or spent catalyst may be transferred from the FCC unit and regenerated catalyst may be supplied the riser of the FCC unit. In an embodiment, the amount of regenerated catalyst supplied to the FCC unit may be adjusted based on the current amount of catalyst within the FCC unit. In such examples, a control system (e.g., controller 402) may determine the current amount of catalyst in the FCC unit based on the amount of coked catalyst transferred to a regenerator, the amount of fresh catalyst supplied to the FCC unit (e.g., which may be a small amount or a small amount in relation to the regenerated catalyst), the amount of regenerated catalyst supplied to the FCC unit, and/or the composition of hydrocarbon products produced by the FCC unit. In another example, the control system (e.g., controller 402) may determine the current amount of catalyst in the FCC unit based on a signal indicating such an amount from a sensor.

At block 304, a gas oil and steam may be supplied to the riser of the FCC unit. In an embodiment, the gas oil may be preheated prior to introduction or being supplied to the riser of the FCC unit. The temperature within the FCC unit (e.g., based on the temperature of the steam, gas oil, and/or catalyst), or the riser and/or reactor of the FCC unit, may be within the range of about 650° F. to about 1050° F., or even higher, to perform a cracking operation based on the type of gas oil supplied to the FCC unit as will be understood by one skilled in the art. Further, heat from regenerated catalyst may be utilized to increase temperature, as described herein and with further detail below, such as the temperature of the riser, reactor, and/or regenerator.

At block 306, the gas oil and steam may mix with the catalyst in the riser of the FCC unit. At block 308, the gas oil may be cracked (e.g., higher molecular weight hydrocarbons are converted or cracked to smaller vaporous molecule). Such a cracking operation may cause coke or carbonaceous material to form on the surface of the catalyst thereby forming a coked catalyst. Forming of the coke on the catalyst may reduce the catalytic capability of the catalyst, thus, to utilize the catalyst in further operations or again, the coked catalyst may be passed through a regenerator.

At block 310, the coked catalyst may be separated from the hydrocarbon or gas products formed via the cracking operation. Such separation may occur via one or more cyclones included in the reactor of the FCC unit. At block 312, the coked catalyst may flow to or be supplied or pumped to the regenerator via a pipe, pipeline, or conduit. The amount and/or rate of coked catalyst flowing to the regenerator may be controlled via a flow control device positioned on the pipe, pipeline, or conduit. At block 314 oxygen (e.g., oxygen and/or ambient and/or atmospheric air) and pyoil (e.g., biomass derived pyrolysis oil) may be supplied to the regenerator (e.g., mixed with the coked catalyst). The oxygen (e.g., oxygen and/or ambient and/or atmospheric air) may be utilized to aid in combustion of the coke deposited on the coked catalyst. Further, if the oxygen is supplied as air, additional oxygen may be supplied with the air. As the operation of regeneration is an exothermic reaction, the temperature within the reactor may increase (e.g., during combustion). Such an operation (e.g., regeneration and cracking) may be a continuous or substantially continuous process. As such, at block 316, the temperature of the regenerator may be determined. In such examples, a temperature sensor may be disposed within the regenerator and utilized to provide an indication of the temperature within the regenerator. The temperature within the regenerator may vary based on the heat from the coked catalyst and the amount of pyoil injected into the regenerator, among other factors. Further, combustion of the pyoil and coke deposited on the coked catalyst may generate flue gas. The flue gas may comprise one or more of nitrogen, nitrogen oxides, carbon dioxide, carbon monoxide, or water vapor. The flue gas may be discharged from the regenerator at an outlet positioned proximate a top or upper portion of the regenerator.

If the temperature within the regenerator is not within a selected temperature, then, at block 318, the amount of pyoil injected into or supplied to the regenerator may be adjusted. For example, if the regenerator is below a selected temperature, then the amount of pyoil injected into the regenerator may be increased, while if the temperature is above the selected temperature, then the amount of pyoil injected into the regenerator may be decreased. After adjustment of the amount of pyoil or if the temperature is within the selected temperature, then, at block 320, the pyoil and coke may be combusted to form a regenerated catalyst. In another embodiment, and as noted, combustion may be continuous. Thus, in such an embodiment, the adjustment of the amount of pyoil injected into the regenerator and combustion of the pyoil and coke may occur in parallel or substantially simultaneously. The amount of pyoil injected into the regenerator may be controlled via a flow control device positioned along an inlet of the regenerator, the inlet configured to allow pyoil to enter the regenerator.

At block 322 an amount of regenerated catalyst may be supplied to the riser of the FCC unit. In an embodiment, the regenerated catalyst may be stored or supplied to a well or stand-pipe, prior to transfer or reintroduction to the riser of the FCC unit. The regenerate catalyst, at this point may be at high temperature that is lower than a temperature at which the catalyst may degrade. The temperature of the regenerated catalyst may be about range of about 1000° F. to 1600° F., of about 1000° F. to about 1500° F., of about 1100° F. to about 1450° F., at about 1250° F. to about 1400° F., or about 1300° F. In one or more other embodiments, the temperature of the catalyst may not exceed greater than about 1450° F., about 1400° F., about 1350° F., about 1300° F., about 1250° F., about 1200° F., about 1150° F., about 1100° F., about 1050° F., and/or about 1000° F. The regenerated catalyst may maintain such a temperature within the well or stand-pipe for a period of time prior to reintroduction or transfer to the riser of the FCC unit. The supplied amount of regenerated catalyst may mix or be mixed with one or more of fresh catalyst, additional or new gas oil, and/or steam. In such embodiments, the cracking operation may continue with the supplied regenerated catalyst. Further, the cracking operation may be a continuous or substantially continuous operation, with such adjustments described herein occurring as the cracking operation is executed.

At block 324, the temperature of or within the riser of the FCC unit and/or of or within the reactor of the FCC unit may be determined (e.g., via a temperature sensor or probe). If the temperatures of the riser and/or reactor are not within a selected temperature, then, at block 326, the amount of regenerated catalyst supplied to the riser and/or the amount of pyoil supplied to the regenerator may be adjusted. In another embodiment, the temperature of or within other portions or locations of the FCC unit may be determined and adjustment of the amount of regenerated catalyst supplied to the riser and/or the amount of pyoil supplied to the regenerator may be performed based on that temperature.

In an embodiment, an amount of fresh catalyst may be supplied (or such a supply may be adjusted) to the riser. The amount of fresh catalyst supplied to the riser may be a small amount in relation to the amount of regenerated catalyst supplied to the riser. In other words, small amounts of fresh catalyst may be supplied to the riser from time to time.

For example, if the FCC unit is operating at slightly below optimal conditions (e.g., the temperature is too cool within the riser and/or reactor), then, rather than or in addition to increasing preheating of the gas oil or increasing the temperature of the steam (or, in other embodiments, being heated via another external heat source), an additional amount of regenerated catalyst, at a higher temperature, may be mixed with the gas oil. Further, the amount of pyoil used in the regenerator may be increased to thereby increase the temperature of the regenerated catalyst. Thus, the overall temperature within the riser and/or reactor may be increased using a renewable resource (e.g., the pyoil) and the overall efficiency of the FCC unit may be increased (e.g., operating at a higher temperature without increasing heating from any other source).

In another embodiment, rather than or in addition to, injection of the pyoil into the regenerator, the pyoil may be included in or injected into a stripping zone of the reactor and/or via a stand-pipe connecting the reactor to the regenerator (e.g., at about 1% to about 2% wt % of pyoil in relation to the gas oil). In such embodiments, the amount of pyoil may be varied based on the same factors described above (e.g., temperature within the regenerator, temperature within riser and/or reactor, and/or temperature of the regenerated catalyst), among other factors. While the pyoil may include high levels of coke precursors and/or aromatics, the use of pyoil, as noted, may increase the temperature within the reactor and increase overall yield of the FCC unit. Further, the pyoil may include low or substantially none of sulfur, thus adding the pyoil, for example, into a stripping zone of the reactor and/or via a stand-pipe connecting the reactor to the regenerator may not impact hydrocarbon or gas product specifications (e.g., particularly specifications with low sulfur). Further, the pyoil may be low in hydrogen, thereby preventing or inhibiting production of saturated products and favoring production of olefinic material.

Further still, the pyoil may include low miscibility with the gas oil and steam. As the pyoil is introduced to the, for example, stripping zone, the pyoil may remain unmixed with the other materials (gas oil, steam, and/or catalyst). In such embodiments, substantially all of the pyoil may flow to the regenerator. The pyoil may then be combusted in the regenerator along with the coke from the coked catalyst and increase the temperature in reactor. In yet another embodiment, additional pyoil may be injected directly into the regenerator to further increase the temperature within the regenerator.

In another embodiment, the method 300 may include determining, based on a signal received by a controller from a temperature sensor positioned within the regenerator, a temperature within the regenerator. Further, the temperature within the FCC unit may be determined, based on a signal received by a controller from a temperature sensor positioned within the FCC unit, a temperature within the FCC unit. Further still, in response to one or more determinations that the temperature within the regenerator is less than a first preselected temperature or that the temperature within the FCC unit is less than a second preselected temperature, a flow control device associated with the biomass-derived pyrolysis oil in signal communication with the controller may be adjusted, via the controller, such that an amount of the biomass-derived pyrolysis oil introduced into the riser may be adjusted based on (1) the temperature within the regenerator and/or (2) the temperature within the FCC unit to thereby adjust the temperature within the regenerator and riser.

FIG. 4 is a simplified diagram illustrating a control system 400 for managing the processing of hydrocarbons and regeneration of catalyst using biomass-derived pyrolysis oil (also referred to as pyoil), according to one or more embodiments disclosed herein. In an example, the control system may include a controller 402 or one or more controllers. Further, the controller 402 may be in signal communication with various other controllers throughout or external to a refinery. The controller 402 may be considered a supervisory controller. In another example, a supervisory controller may include the functionality of controller 402.

Each controller 402 described above and herein may include a machine-readable storage medium (e.g., memory 406) and one or more processors (e.g., processor 404). As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory 406 may store or include instructions executable by the processor 404. As used herein, a "processor" may include, for example one processor or multiple processors included in a single device or distributed across multiple computing devices. The processor 404 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

In an embodiment, the controller 402 may obtain the temperature at various points and/or locations or of materials in the system 400 or FCC unit. For example, a reactor temperature sensor 422 or probe may provide, in real-time and/or continuously or at regular intervals, a signal to the controller 402 indicative of the temperature within the reactor and/or indicative of temperature of the materials within the reactor. In another example, a regenerator temperature sensor 420 or probe may provide, in real-time and/or continuously or at regular intervals, a signal to the controller 402 indicative of the temperature within the regenerator and/or indicative of temperature of the materials within the reactor. Other temperatures sensors and/or probes may be positioned at varying locations throughout the system, e.g., including, but not limited to, at each inlet of the reactor, riser, and/or regenerator; at each outlet of the reactor, riser, and/or regenerator; and/or within a well or stand-pipe configured to store regenerated catalyst. Other sensors may be disposed throughout the system 400 to measure or indicate various other aspects or characteristic within the system, e.g., such as a coked catalyst meter 416 (e.g., to indicate a flow rate and/or amount of coked catalyst flowing from the riser or reactor), a regenerated catalyst meter 424 (e.g., to indicate a flow rate and/or amount of regenerated catalyst flowing to the riser and/or a well or stand pipe), a pyoil meter 426 (e.g., to indicate a flow rate and/or amount of pyoil flowing to the riser and/or regenerator), and/or an air (and/or separate and/or additional oxygen) meter 430 (e.g., to indicate a flow rate and/or amount of air (and/or separate and/or additional oxygen) flowing to the regenerator). Other sensors or probes may measure or indicate pressure and/or other characteristics.

In an example, the sensors or probes positioned and/or disposed throughout the system 400 may be pressure transducers, flow meters, mass flow meters, Coriolis meters, other measurement sensors to determine a density, flow, temperature, or other variable as will be understood by those skilled in the art, or some combination thereof. In such examples, the sensors may measure the density of a fluid or material, the flow of the fluid or material, the temperature of the fluid or material, and/or the pressure within various locations of the system (e.g., within the reactor, riser, and/or regenerator). As noted above, the controller 402 may be in signal communication with the sensors, probes, or meters. The controller 402 may poll or request data from the sensors at various points or substantially continuously during a cracking and/or regeneration operation.

In an embodiment, the system 400 may include one or more different flow control devices. For example, the system 400 may include a coked catalyst flow control device 418, a regenerated catalyst flow control device 427, a pyoil flow control device 428, an air (and/or separate and/or additional oxygen) flow control device 432, and/or other flow control devices to control an amount of material or fluid flowing from one location to another. Each flow control device may include one or more of a pump, a meter (as described herein), a sensor or probe (as described herein), a valve (e.g., a control valve, a slide valve, or another valve configured to control an amount of fluid or material flowing therethrough), and/or some combination thereof. In such examples, each component of the flow control device may be in signal communication with the controller 402. The flow control devices may allow for adjustment of the flow of the fluid or material based on various factors received by the controller 402.

The controller 402, according to an embodiment, may include instructions 408 to determine a wt % of pyoil in relation to coked catalyst, gas oil or feed, or another material or fluid in the system. In such embodiments, the controller 402 may determine such a value based on a number of factors. For example, if the controller 402 is determining wt % of pyoil in relation to gas oil or feed flowing into a riser, then the controller 402 may determine such a value based on the amount of gas oil or feed flowing into the riser and the amount of the pyoil injected into the regenerator, stripping zone, and/or a stand-pipe, along with the amount of gas oil or feed. In another example, if the controller 402 is determining wt % of pyoil in relation to coked catalyst flowing into the regenerator (e.g., when pyoil is injected into directly into the regenerator), then the controller 402 may determine such a value based on the amount of coked catalyst flowing into the regenerator and the amount of the pyoil injected into the regenerator.

The controller 402, in another embodiment, may include instructions 410 to adjust the pyoil injection rate. In an embodiment, to maximize efficiency and reduce cost, the controller 402 may introduce an amount of pyoil to increase the temperature within the regenerator. Initially, the amount of pyoil may be greater than 0% to about 2% wt % in relation to feed or coked catalyst (based on where the pyoil is injected). After such an initial amount is injected and during cracking operations, the amount of pyoil may be adjusted to between about 0% to about 2% wt % as noted. The controller 402 may determine whether to increase or decrease the amount of pyoil based on the temperature within the reactor, the current wt % of the pyoil, the pyoil flow rate, the flow rate of the coked catalyst flowing into the regenerator, the temperature of the coked catalyst, and/or the temperature within the regenerator, among other factors. For example, the controller 402 may, in response to the temperature within the regenerator and/or temperature of the regenerated catalyst being less than a selected temperature, increase the amount of pyoil directly injected into the regenerator. Such an increase may occur based on the controller 402 sending a signal indicating an increase in amount of pyoil to a pyoil flow control device 428. In yet another example, the controller 402 may decrease the amount of pyoil injected into the regenerator or riser if the temperature of the reactor is above a selected temperature. In an embodiment, the controller 402, in addition to adjusting or determining an adjustment to pyoil injection rate, may determine an amount of and/or injection rate of oxygen and/or air. For example, based on the temperature within the regenerator, the controller 402 may adjust an amount of oxygen to inject directly into the regenerator, an amount of additional oxygen to mix with air supplied to the regenerator, and/or adjust the flow rate of air and/or oxygen supplied to the regenerator.

The controller 402 may additionally include instructions 412 to determine a rate and/or amount of regenerated catalyst to supply to a riser of an FCC unit to mix with additional and/or new gas oil and/or steam. In an embodiment, the regenerator of a FCC unit may regenerate catalyst, as described herein. In other words, the regenerator may enable coked or spent catalyst to perform further catalytic functions based on combustion of the coke deposited on the coked or spent catalyst. Prior to the regenerated catalyst being reintroduced into or supplied to the riser, the controller 402 may determine the temperature within the riser and/or the reactor, the temperature within the regenerator, the temperature of the regenerated catalyst, the temperature of fresh catalyst, the temperature of the gas oil or feed, and/or the amount of regenerated catalyst in a well or stand-pipe, among other factors. Based on these factors the amount of regenerated catalyst being mixed in the riser may be varied. For example, if the temperature within the reactor and/or riser (or, in other embodiments, various other locations within a FCC unit) is less than a preselected temperature, then the controller may increase the amount of regenerated catalyst flowing to the riser. As the amount of regenerated catalyst is increased, the temperature within the riser may increase, thus the gas oil or feed and the steam may not utilize additional pre-heating thereby saving energy, reducing cost, and/or reducing emissions.

Such an increase or decrease of the flow of regenerated catalyst may be controlled via the regenerated catalyst flow control device 427. The controller 402 may send signals indicating adjustment of flow rate of the regenerated catalyst to the regenerated catalyst flow control device 427.

In another embodiment, the controller 402 may control flow rates of other materials or fluids, such as the amount of air (and/or separate and/or additional oxygen) introduced into the regenerator (e.g., via the air (and/or separate and/or additional oxygen) flow control device 432), the amount of coked catalyst flowing into the regenerator (e.g., via the coked catalyst flow control device 418), the amount of pyoil flowing into the regenerator or riser (e.g., via the pyoil flow control device 428), and/or the amount of gas oil or feed flowing into the riser. Other factors, as noted, may be utilized in adjusting such flow rates, such as pressure, density, and/or temperature, among other factors (e.g., for example, capacity of the reactor, riser, and/or well or stand-pipe).

In another embodiment, the controller 402 may comprise or include a first set of one or more inputs in signal communication with one or more sensors (e.g., the coked catalyst meter 416, the regenerator temperature sensor 420, the reactor temperature sensor 422, the catalyst meter 424, the regenerated catalyst meter 425, the pyoil meter 426, the air (and/or separate and/or additional oxygen) meter 430, and/or a riser temperature sensor). The one or more sensors may be positioned within or proximate to one or more of a regenerator, a riser of an FCC unit, a reactor of the FCC unit, and/or other conduits or pipe and/or inlets and/or outlets associated with the regenerator, the riser of the FCC unit, and/or the reactor of the FCC unit. The controller 402 may receive signals from the one or more sensors indicative of a characteristic. The characteristic may comprise one or more of temperature, pressure, and/or flow rate. The controller 402 may comprise a first set of one or more inputs/outputs in signal communication with one or more flow control devices (e.g., the coked catalyst flow control device 418, the regenerated catalyst flow control device 427, the pyoil flow control device 428, and/or the air (and/or separate and/or additional oxygen) flow control device 432) positioned on one or more inlets or outlets associated with the regenerator, the riser of the FCC unit, and/or the reactor of the FCC unit. The controller 402 may, in response to the characteristic from one of the one or more sensors being less than or greater than a preselected threshold (e.g., a temperature, pressure, or flow rate range), adjust the one or more flow control devices via a signal indicating a new flow rate for the flow control device to adjust to.

FIG. 5 is a graphical representation 500 of the change in regenerator temperature with and without the introduction of the biomass-derived pyrolysis oil into the regenerator of the FCC reactor. Regenerator temperatures are increased without impacting FCC product specifications such as gasoline sulfur. This temperature increase can range from at least about 2° F. to about 25° F.

Certain embodiments relate to a method of decreasing energy consumption by a FCC unit in a refinery operation by introduction of a biomass-derived pyrolysis oil into the regenerator of the FCC unit. In certain embodiments, the method includes increasing temperature in a regenerator unit of an FCC unit by introduction of a biomass-derived pyrolysis oil into the regenerator of the FCC unit in an amount ranging from one and two volume percent of the gas oil introduced into the riser of the FCC unit. In certain embodiments, the method includes increasing temperature in a regenerator unit of an FCC unit by introduction of a biomass-derived pyrolysis oil into the regenerator of the FCC unit in an amount less than two volume percent of the gas oil introduced into the riser of the FCC unit. Certain embodiments relate to a method of increasing delta coke by a FCC unit in a refinery operation by introduction of a biomass-derived pyrolysis oil into the regenerator of the FCC unit. Delta coke is the difference between the coke on coked FCC catalyst leaving the stripper and the coke on regenerated catalyst (CRC) leaving the regenerator, which is expressed in weight percent of the catalyst.

Specific compositions, methods, or systems are intended to be only illustrative of the embodiments disclosed by this specification. Variation on these systems, methods, or embodiments are readily apparent to a person of skill in the art based upon the teachings of this specification and are therefore intended to be included as part of the inventions disclosed herein.

The present application claims priority to and the benefit of U.S. Provisional Application No. 63/262,342, filed Oct. 10, 2021, titled "METHODS AND SYSTEMS FOR ENHANCING PROCESSING OF HYDROCARBONS IN A FLUID CATALYTIC CRACKING UNIT USING A RENEWABLE ADDITIVE," the disclosure of which is incorporated herein by reference in its entirety.

The above detailed description is given for explanatory or illustrative purposes. It will be apparent to those skilled in the art that numerous changes and modifications can be made without departing from the scope of the inventive aspects of the technology. Accordingly, the whole of the foregoing description is to be construed in an illustrative and not a limitative sense, the scope of the invention being defined solely by the appended claims.

The invention claimed is:

1. A method of processing a gas oil in a fluid catalytic cracking (FCC) unit, the method comprising:
introducing the gas oil and steam into a riser of a FCC unit;
mixing the gas oil and the steam with a FCC catalyst fluidized in the riser;
cracking the gas oil into one or more FCC hydrocarbon products in the FCC unit, thereby to cause one or more surfaces of the FCC catalyst to be at least partially covered by coke so as to define a coked FCC catalyst;
separating the coked FCC catalyst from the one or more FCC hydrocarbon products in a cyclone of the FCC unit;
passing the coked FCC catalyst from the cyclone of the FCC unit to a regenerator;
introducing at least oxygen and a biomass-derived pyrolysis oil into the regenerator;
combusting a combination of the biomass-derived pyrolysis oil and the coke from the coked FCC catalyst in the regenerator, thereby to oxidize via the oxygen and produce a regenerated FCC catalyst and a flue gas; and supplying the regenerated FCC catalyst from the regenerator to the riser of the FCC unit.

2. The method of claim 1, wherein combusting the biomass-derived pyrolysis oil in the regenerator allows temperature inside the regenerator to be increased without adversely affecting one or more properties of the one or more FCC hydrocarbon products.

3. The method of claim 1, wherein combusting the biomass-derived pyrolysis oil in the regenerator increases temperature inside the regenerator by at least about 5° F. while maintaining sulfur specifications of the one or more FCC hydrocarbon products.

4. The method of claim 1, wherein combusting the biomass-derived pyrolysis oil in the regenerator increases temperature inside the regenerator by at least about 5° F. while maintaining sulfur specification of gasoline in the one or more FCC hydrocarbon products below a pre-selected value.

5. The method of claim 1, wherein the biomass-derived pyrolysis oil is introduced proximate to a bottom portion of the regenerator.

6. The method of claim 1, wherein the biomass-derived pyrolysis oil is introduced into a bed of catalyst positioned inside the regenerator.

7. The method of claim 1, wherein the biomass-derived pyrolysis oil has an effective hydrogen index of less than 1.5.

8. The method of claim 1, wherein the biomass-derived pyrolysis oil has an effective hydrogen index of less than 1.

9. The method of claim 1, wherein the biomass-derived pyrolysis oil is introduced in an amount less than about 2 volume percent of the gas oil introduced into the riser of the FCC unit.

10. The method of claim 1, wherein the biomass-derived pyrolysis oil is introduced in an amount ranging from about 1 to 2 volume percent of the gas oil introduced into the riser of the FCC unit.

11. The method of claim 1, further comprising:
determining, based on a signal received by a controller from a temperature sensor positioned within the regenerator, a temperature within the regenerator; and
in response to a determination that the temperature within the regenerator is less than a preselected temperature, adjusting, via a flow control device associated with the biomass-derived pyrolysis oil in signal communication with the controller, an amount of the biomass-derived pyrolysis oil introduced into the regenerator to thereby adjust the temperature within the regenerator.

12. A method of processing a gas oil in a fluid catalytic cracking (FCC) unit to increase yield selectivities, the method comprising:
introducing the gas oil and steam into a riser of a FCC unit;
mixing the gas oil and the steam with a catalyst fluidized in the riser;
cracking the gas oil into one or more hydrocarbon products in the FCC unit, thereby to cause one or more surfaces of the catalyst to be at least partially covered by coke so as to define a coked catalyst;
separating the coked catalyst and pyoil from the one or more hydrocarbon products in a cyclone positioned in an upper portion of the FCC unit;
introducing a biomass-derived pyrolysis oil into one or more of a stripping zone of the FCC unit or a stand-pipe configured to connect the FCC unit to a regenerator;
passing the coked catalyst and the biomass-derived pyrolysis oil from the cyclone of the FCC unit to the regenerator;
introducing at least oxygen into the regenerator;
combusting a combination of the biomass-derived pyrolysis oil and the coke from the coked catalyst in the regenerator, thereby to oxidize via the oxygen and produce a regenerated catalyst and a flue gas; and
returning the regenerated catalyst from the regenerator to the riser of the FCC unit.

13. The method of claim 12, further comprising: introducing additional biomass-derived pyrolysis oil into the regenerator.

14. The method of claim 13, wherein an amount of biomass-derived pyrolysis oil introduced into the FCC unit and an amount of additional biomass-derived pyrolysis oil introduced into the regenerator are based on one or more of a temperature within the regenerator, a temperature within the riser, or a temperature of the regenerated catalyst.

15. The method of claim 12, wherein the low sulfur content of the biomass-derived pyrolysis oil causes the hydrocarbon product to remain within a sulfur specification.

16. The method of claim 12, wherein the low hydrogen content of the biomass-derived pyrolysis oil inhibits production of saturated products and increases production of olefinic material.

17. The method of claim 12, further comprising:
determining, based on a signal received by a controller from a temperature sensor positioned within the regenerator, a temperature within the regenerator; and
determining, based on a signal received by a controller from a temperature sensor positioned within the FCC unit, a temperature within the FCC unit.

18. The method of claim 17, further comprising:
in response to one or more determinations that the temperature within the regenerator is less than a first preselected temperature or that the temperature within the FCC unit is less than a second preselected temperature:
adjusting, via a flow control device associated with the biomass-derived pyrolysis oil in signal communication with the controller, an amount of the biomass-derived pyrolysis oil introduced into the FCC unit based on the temperature within the regenerator and the temperature within the FCC unit to thereby adjust the temperature within the regenerator and FCC unit.

19. The method of claim 12, wherein the biomass-derived pyrolysis oil has an effective hydrogen index of less than 1.5.

20. The method of claim 12, wherein the biomass-derived pyrolysis oil has an effective hydrogen index of less than 1.

21. A system for processing a gas oil in a fluid catalytic cracking (FCC) unit, the system comprising:
a riser having a first inlet to receive a gas oil stream, a second inlet to receive steam, and a third inlet to receive a FCC catalyst, the riser configured to be operated under cracking reaction pressure and temperature conditions to facilitate mixing and catalytic cracking of the gas oil stream in presence of the steam and the FCC catalyst to form a plurality of FCC products and coked FCC catalyst;
a reactor having (i) a FCC reaction zone connected to and in fluid communication with the upper portion of the riser and operated to continue the cracking of the gas oil stream in presence of the steam and the FCC catalyst to form more of the plurality of FCC products and more of the coked FCC catalyst, (ii) a separation zone to separate the plurality of FCC products from the coked FCC catalyst, and (iii) a first outlet stream to transport the plurality of FCC products to a fractionation zone to separate the plurality of FCC products into one or more of propylene, isobutene, butylenes, gasoline, distillate, diesel fuel, heating oil, slurry oil, or wet gas; and a regenerator connected to and in fluid communication with a second outlet stream of the reactor and having a fourth inlet stream to receive at least oxygen, a fifth inlet stream in fluid communication with a biomass-derived pyrolysis oil, a third outlet stream being connected to and in fluid communication with the third inlet of the riser to supply a regenerated FCC catalyst to the riser, and a fourth outlet stream positioned to discharge a flue gas containing one or more of nitrogen, nitrogen oxides, carbon dioxide, carbon monoxide, or water vapor, the regenerator being operated to oxidize coke on the coked FCC catalyst and the biomass-derived pyrolysis oil, thereby to produce the regenerated FCC catalyst and the flue gas.

22. The system of claim 21, further comprising a stripping zone connected to and in fluid communication with the second outlet stream and the regenerator, the stripping zone being operated to remove adsorbed and entrained hydrocarbons from the coked FCC catalyst prior to supplying the coked FCC catalyst to the regenerator.

23. The system of claim 21, wherein the regenerator is configured to increase temperature inside the regenerator by at least about 5° F. while maintaining a sulfur level in each of the plurality of FCC products, based on one or more specifications of the plurality of FCC products produced by processing the gas oil, below a pre-selected value.

24. The system of claim 23, wherein the regenerator is configured to increase temperature inside the regenerator by at least about 5° F. while maintaining a sulfur level in each of the plurality of FCC products, based on a specification of gasoline in the plurality of FCC products, below a pre-selected value.

25. The system of claim 21, wherein said system is configured to introduce the biomass-derived pyrolysis oil proximate to a bottom portion of the regenerator.

26. The system of claim 21, wherein said system is configured to introduce the biomass-derived pyrolysis oil into a bed of the coked FCC catalyst positioned inside the regenerator.

27. The system of claim 21, wherein said system is configured to introduce the biomass-derived pyrolysis oil in an amount less than about 2 volume percent of the gas oil introduced into the riser of the FCC unit.

28. The system of claim 21, wherein said system is configured to introduce the biomass-derived pyrolysis oil in an amount ranging from about 1 to 2 volume percent of the gas oil introduced into the riser of the FCC unit.

29. The system of claim 21, further comprising:
a temperature sensor positioned within the regenerator to measure a temperature within the regenerator; and
a controller in signal communication with the temperature sensor, the controller configured to, in response to a determination that the temperature within the regenerator is less than a preselected temperature, adjust an amount of the biomass-derived pyrolysis oil supplied to the regenerator.

* * * * *